US010293689B2

(12) United States Patent
Ogata

(10) Patent No.: US 10,293,689 B2
(45) Date of Patent: May 21, 2019

(54) DISPLAY DEVICE, VEHICLE

(71) Applicant: Tetsuya Ogata, Kanagawa (JP)

(72) Inventor: Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/370,730

(22) Filed: Dec. 6, 2016

(65) Prior Publication Data

US 2017/0080801 A1  Mar. 23, 2017

Related U.S. Application Data

(63) Continuation of application No. PCT/JP2015/065467, filed on May 28, 2015.

(30) Foreign Application Priority Data

Jul. 1, 2014 (JP) .................. 2014-135605

(51) Int. Cl.
*G02B 27/01* (2006.01)
*B60K 35/00* (2006.01)
(Continued)

(52) U.S. Cl.
CPC ............... *B60K 35/00* (2013.01); *B60R 1/00* (2013.01); *G02B 27/01* (2013.01);
(Continued)

(58) Field of Classification Search
CPC ... G09G 2320/0233; G09G 2320/0626; G09G 2360/14; G09G 2360/141;
(Continued)

(56) References Cited

U.S. PATENT DOCUMENTS 8,593,373 B2 * 11/2013 Kanamori .............. G09G 3/002
345/690
8,675,127 B2   3/2014 Nakajima et al.
(Continued)

FOREIGN PATENT DOCUMENTS

EP  2 833 194 A1   2/2015
JP  H05-278498   10/1993
(Continued)

OTHER PUBLICATIONS

English Language Machine Translation of JP-2005331624A.*
(Continued)

*Primary Examiner* — Jason M Mandeville
(74) *Attorney, Agent, or Firm* — Oblon, McClelland, Maier & Neustadt, L.L.P.

(57) ABSTRACT

A display device is for displaying a virtual image in front of a driver of a vehicle. The display device includes a detecting unit that receives light surrounding the vehicle, and detects a brightness of the received light; a restricting unit that restricts an angle of the received light; a correcting unit that adjusts a luminance of a display image, according to the detected brightness of the light; and a displaying unit that superimposes and displays the display image on a field of vision of the driver as the virtual image, based on the adjusted luminance. The restricting unit includes two opening restricting elements arranged on a front side of the detecting unit, such that an angle θ2 at which the detecting unit receives the light is restricted according to an angle θ1 formed by light beams directed from the virtual image toward eyes of the driver.

8 Claims, 12 Drawing Sheets

(51) Int. Cl.
*B60R 1/00* (2006.01)
*G09G 5/10* (2006.01)
*G09G 3/00* (2006.01)

(52) U.S. Cl.
CPC ......... *G02B 27/0101* (2013.01); *G09G 3/001* (2013.01); *G09G 5/10* (2013.01); *B60K 2350/2013* (2013.01); *B60K 2350/2052* (2013.01); *B60K 2350/2069* (2013.01); *B60K 2350/352* (2013.01); *B60R 2300/205* (2013.01); *B60R 2300/308* (2013.01); *B60Y 2400/92* (2013.01); *G02B 2027/014* (2013.01); *G02B 2027/0118* (2013.01); *G02B 2027/0138* (2013.01); *G02B 2027/0141* (2013.01); *G02B 2027/0145* (2013.01); *G02B 2207/123* (2013.01); *G09G 2320/0626* (2013.01); *G09G 2360/144* (2013.01); *G09G 2380/10* (2013.01)

(58) Field of Classification Search
CPC ......... G09G 2360/144; G09G 2380/10; G02B 2027/0118; G02B 2027/0183; G02B 27/017; B60R 2300/205
USPC .................................. 345/7–9, 207, 214, 77
See application file for complete search history.

(56) References Cited

U.S. PATENT DOCUMENTS

| | | | |
|---|---|---|---|
| 9,134,536 B2 | 9/2015 | Sekiya et al. | |
| 2001/0026322 A1* | 10/2001 | Takahashi | H01L 27/14627 348/340 |
| 2007/0290284 A1* | 12/2007 | Shaffer | H01L 27/1446 257/432 |
| 2010/0283998 A1* | 11/2010 | Souchkov | G01J 1/02 356/141.2 |
| 2011/0102483 A1* | 5/2011 | Kanamori | G09G 3/002 345/690 |
| 2011/0234803 A1 | 9/2011 | Nakajima et al. | |
| 2011/0242321 A1 | 10/2011 | Nakajima et al. | |
| 2014/0146214 A1 | 5/2014 | Nakajima et al. | |
| 2014/0152711 A1* | 6/2014 | Sekiya | G02B 27/01 345/690 |
| 2015/0035725 A1 | 2/2015 | Kawaguchi et al. | |
| 2015/0130687 A1 | 5/2015 | Kitamura et al. | |

FOREIGN PATENT DOCUMENTS

| | | | |
|---|---|---|---|
| JP | H06-206470 | | 7/1994 |
| JP | H11-067464 | | 3/1999 |
| JP | 3473321 | | 12/2003 |
| JP | 2004-351943 | | 12/2004 |
| JP | 2005-014788 | | 1/2005 |
| JP | 2005-331624 | | 12/2005 |
| JP | 2005331624 A | * | 12/2005 |
| JP | 2010139688 A | * | 6/2010 |
| JP | 2010-145924 | | 7/2010 |
| JP | 2011-017802 | | 1/2011 |
| JP | 2011-098634 | | 5/2011 |
| JP | 2013-015738 | | 1/2013 |
| JP | 2013-224068 | | 10/2013 |
| JP | 2014-019371 | | 2/2014 |
| JP | 2014-019372 | | 2/2014 |
| WO | WO 2013/146160 A1 | | 10/2013 |

OTHER PUBLICATIONS

Extended Search Report dated Sep. 6, 2017 in European Patent Application No. 15814150.7.
International Search Report dated Aug. 18, 2015 in PCT/JP2015/085467 filed on May 28, 2015(with English Translation).
Written Opinion dated Aug. 18, 2015 in PCT/JP2015/065467 filed on May 28, 2015.

* cited by examiner

INCIDENT ANGLE θ=0

INCIDENT ANGLE θ=θm

INCIDENT ANGLE $\theta = \theta n$

DISPLAY DEVICE, VEHICLE

CROSS-REFERENCE TO RELATED APPLICATION

The present application is a continuation application of International Application No. PCT/JP2015/065467 filed on May 28, 2015, which claims priority to Japanese Patent Application No. 2014-135605 filed in Japan on Jul. 1, 2014. The contents of these applications are incorporated herein by reference in their entirety.

BACKGROUND OF THE INVENTION

1. Field of the Invention

The present invention relates to a display device, and a vehicle in which the display device is installed.

2. Description of the Related Art

There is known a display device (so-called Head-Up Display) that is installed in a vehicle and that displays virtual images in the field of vision of the driver. As one example, there is a display device in which the display is made to be easily viewable by reducing the flickering in the luminance of the display caused by rapid changes in the brightness around the vehicle. In this display device, the brightness around the vehicle is detected by an illuminance sensor, the detected brightness is averaged by a microcomputer, and the luminance of the display is controlled according to this averaged brightness (illuminance information).

Patent Document 1: Japanese Unexamined Patent Application Publication No. H6-206470

SUMMARY OF THE INVENTION

An aspect of the present invention provides a display device and a vehicle, in which one or more of the above-described disadvantages are reduced.

According to one aspect of the present invention, there is provided, a display device for displaying a virtual image in front of a driver of a vehicle, the display device including an illuminance detecting unit configured to receive light surrounding the vehicle, and detect a brightness of the received light; an uptake angle restricting unit configured to restrict an angle of the light received by the illuminance detecting unit; an outside light correcting unit configured to adjust a luminance of a display image, according to the brightness of the light detected by the illuminance detecting unit; and an image displaying unit configured to display the display image by superimposing the display image on a field of vision of the driver as the virtual image, based on a result of adjusting the luminance, wherein the uptake angle restricting unit includes two opening restricting elements arranged on a front side of the illuminance detecting unit such that an angle $\theta 2$ at which the illuminance detecting unit receives the light is restricted according to an angle $\theta 1$ formed by light beams directed from the virtual image toward eyes of the driver.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
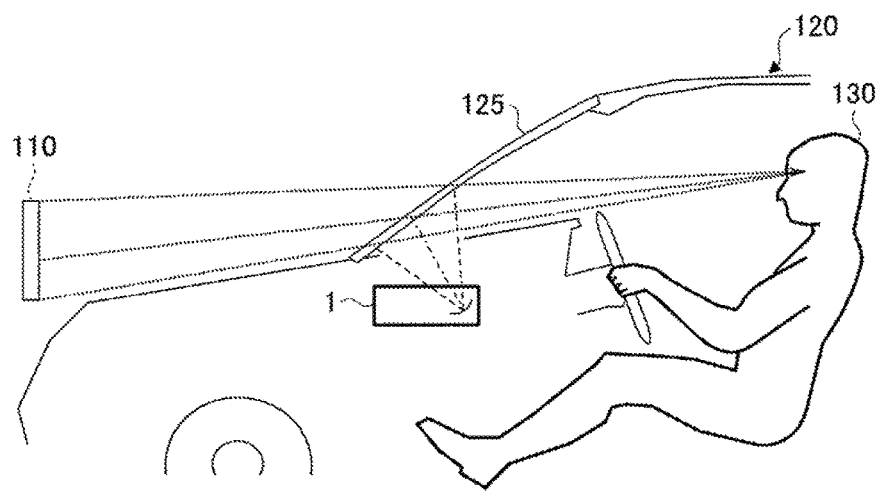
FIG. 1 is a schematic diagram illustrating an example of a display device according to a first-embodiment (part 1)

In the related art, a photoexcitation type photodiode, etc., which is generally used as an illuminance sensor, reacts to obliquely incident light, and generally has an uptake angle of approximately 60°. On the other hand, an angle, which is formed by a light beam directed toward the driver's eyes from the virtual image, is significantly smaller than approximately 60°.

Therefore, even when an illuminance sensor is supposed to detect only the illuminance information in the background of the virtual image, actually, the illuminance sensor detects the illuminance information of a wider range than the background of the virtual image, and cannot accurately detect the illuminance information in the background of the virtual image. As a result, a problem occurs in that the luminance is adjusted based on inaccurate illuminance information, and the adjusted luminesce is deviated from an appropriate value.

A problem to be solved by an embodiment of the present invention is to provide a display device, etc., capable of accurately detecting the illuminance information of the background of the virtual image.

In the following, a description is given of embodiments of the present, invention referring to drawings. In the drawings, the same elements are denoted by the same reference numerals, and overlapping descriptions may be omitted.

<First Embodiment>

Figure 2:
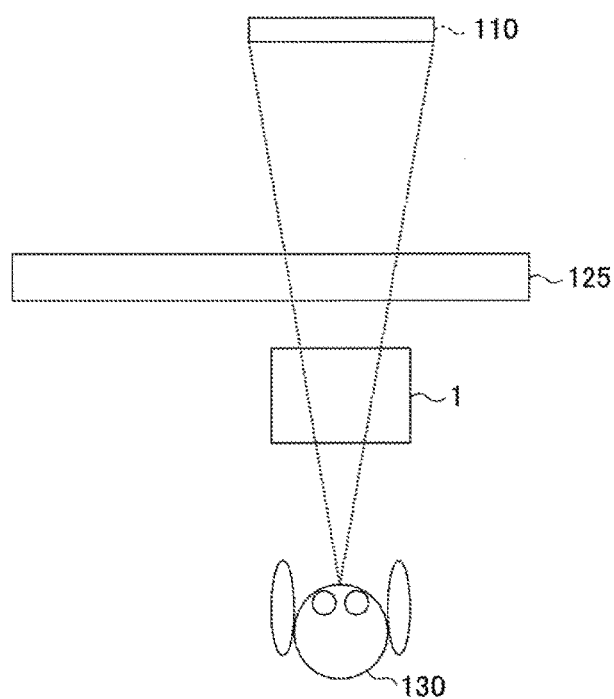
FIG. 2 is a schematic diagram illustrating an example of the display device according to the first embodiment (part 2)

FIGS. 1 and 2 are schematic diagrams illustrating an example of a display device according to a first embodiment. Preferring to FIGS. 1 and a display device I is installed in an own vehicle 120, and is a so-called Head-Up Display having a function of projecting a predetermined image onto a windshield 125 in front of a driver 130, and displaying the predetermined image by superimposing the predetermined image on the field of vision of the driver 130 as a virtual image 110. The display device 1 may be arranged at any position so as to conform to the interior design of the own vehicle 120; for example, the display device 1 may be arranged on the dashboard of the own vehicle 120. The display device 1 may be embedded in the dashboard of the own vehicle 120.

Figure 3:
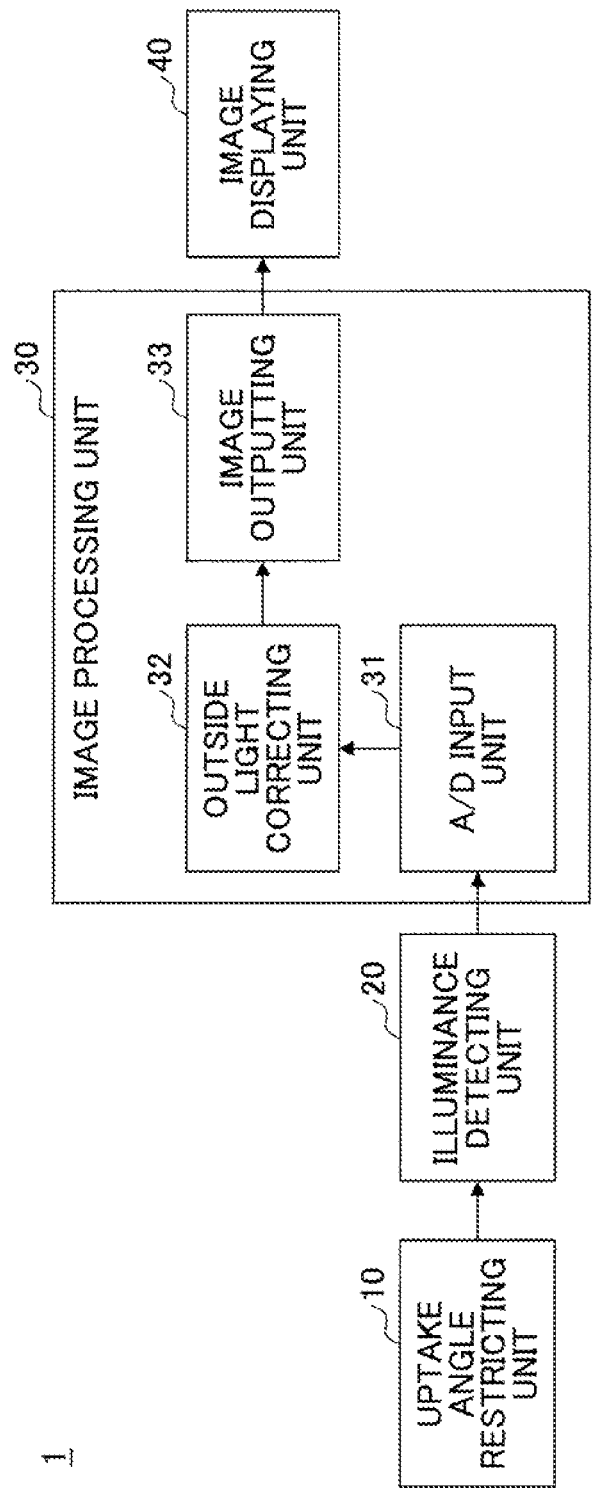
FIG. 3 is a block diagram illustrating an example of the display device according to the first embodiment.

FIG. 3 is a block diagram illustrating an example of the display device according to the first embodiment. Referring to FIG. 3, the display device 1 includes an uptake angle restricting unit 10, an illuminance detecting unit 20, an image processing unit 30, and an image displaying unit 40.

The uptake angle restricting unit 10 has a function of transmitting, as emission information, only the outside light that enters at a predetermined angle, of the outside light that enters the display device 1. A specific configuration example of the uptake angle restricting unit ID is described below.

The illuminance detecting unit 20 has a function of receiving the outside light transmitted through the uptake angle restricting unit 10, and converting the outside light into electronic signals analog signals). That is, the illuminance detecting unit 20 is able to detect the brightness (illuminance information) of the outside light in the environment surrounding the own vehicle 120. As the illuminance detecting unit 20, for example, a photoexcitation type photodiode, and a pyroelectric detector using a permanent dipole moment of a ferroelectric crystal, etc., may be used.

The image processing unit 30 includes an A/D input unit 31, an outside light correcting unit 32, and an image output ting unit 33. The image processing unit 30 may have a configuration including, for example, a CPU (Central Processing Unit), a ROM (Read-Only Memory), a RAM (Random Access Memory), and a main memory, etc. In this case, various functions of the image processing unit 30 may be realized by loading programs, which are recorded in the ROM, etc., in a main memory, and executing the programs by the CPU. However, part of or all of the image processing unit 30 may be realized only by hardware. Furthermore, the image processing unit 30 may be physically formed by a plurality of devices, etc.

The image processing unit 30 has a function of performing predetermined image processing on the display image based on the illuminance information obtained from the illuminance detecting unit 20, and outputting the display image to the image displaying unit 40. Specifically, analog signals are input from the illuminance detecting unit 20 to the A/D input unit 31 of the image processing unit 30, and are converted into digital signals indicating illuminance information at the A/D input unit 31.

The digital signals (illuminance information), which have been obtained as a result of conversion at the A/D input unit 31, are input to the outside light correcting unit 32. The outside light correcting unit 32 adjusts the luminance of the display image based on the input illuminance information (brightness information of outside light). For example, a relationship between the emission information obtained from the A/D input unit 31 and an appropriate luminance is stored as a correction table, etc., in a ROM, etc., in advance, and the outside light correcting unit 32 selects an adjustment value for an appropriate luminance corresponding to the brightness of the outside light, based on the stored information.

The adjustment value for the luminance selected by the outside light correcting unit 32 is input to the image outputting unit 33. The image outputting unit 33 instructs the image displaying unit 40 to appropriately control the light volume, based on the adjustment result of the luminance obtained by the outside light correcting unit 32 (the adjustment value of the luminance obtained from the outside light correcting unit 32). For example, the image outputting unit 33 instructs the image displaying unit 40 to appropriately control the light volume of the laser that is the light source.

Note that a display image is an image that is displayed by being superimposed on the field of vision of the driver 130 as the virtual image 110. For example, when a car-mounted camera (not illustrated) is installed in the own vehicle 120, the display image may be an image acquired from the car-mounted camera. Furthermore, the display image may be an image displaying the vehicle speed by values, etc., (for example, 60 km/h, etc,), generated based on vehicle speed information acquired from a vehicle speed sensor (not illustrated). Alternatively, the display image may be an image stored in a ROM, etc., in advance.

The image displaying unit 40 has a function of displaying an image obtained from the image processing unit 30 by superimposing the image on the field of vision of the driver 130, as the virtual image 110. The image displaying unit 40 is a module that can display an intermediate image, which is generated internally, as an enlarged virtual image with mirrors and lenses, etc., and display the image to have a predetermined sense of distance from the view point of the driver 130. Embodiments of the image displaying unit 40 are a panel projection type image displaying unit and a laser scanning type image displaying unit, etc.; however, in the present embodiment, any of the embodiments may be used. In the following, a description is given of a laser scanning type image displaying unit 40.

Figure 4:
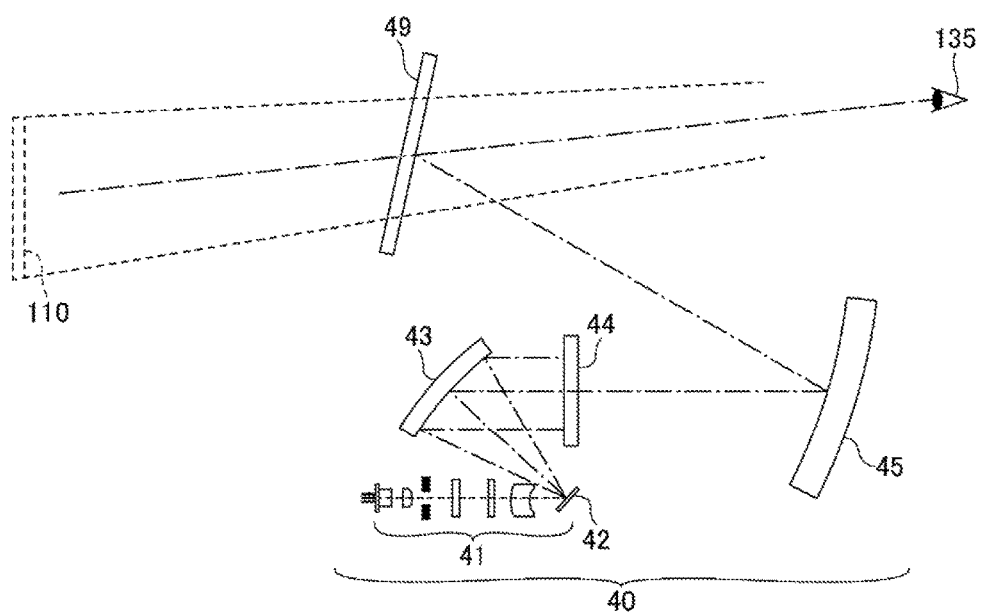
FIG. 4 is a diagram illustrating an example of an image displaying unit according to the first embodiment.

FIG. 4 is a diagram illustrating an example of the image displaying unit according to the first embodiment. Referring to FIG. 4, in summary, the image displaying unit 40 includes a light source unit 41, an optical deflector 42, a first mirror 43, a scanned, surface 44, and a second mirror 45. Note that in FIG. 4, 135 denotes the eyeballs of the driver (hereinafter, eyeballs 135).

The light source unit 41 includes, for example, three laser light sources corresponding to RGB, a coupling lens, an aperture, a composite element, and lenses, etc. The laser beams emitted from the three laser light sources are combined and guided toward the reflective surface of the optical deflector 42. The laser beams guided to the reflective surface of the optical deflector 42 are deflected two-dimensionally by the optical deflector 42.

As the optical deflector 42, for example, one minute mirror that oscillates with respect to two axes that are orthogonal to each other, or two minute mirrors that oscillate or rotate with respect to a single axis, etc., may be used. The optical deflector 42 may be, for example, MEMS (Micro Electro Mechanical Systems) fabricated by a semiconductor process, etc. The optical deflector 42 may be driven by an actuator that uses the deformation force of, for example, a piezoelectric element as the driving force.

The light flux that is two-dimensionally deflected by the optical deflector 42 is made incident on the first mirror 43, and is then returned from the first mirror 43 to draw a two-dimensional image on the scanned surface 44. The scanned surface 44 is a surface having transmittivity, on which a two-dimensional image is formed as the light flux reflected by the first mirror 43 is made incident on the scanned surface 44. The light flux that is emitted from the scanned surface 44 is displayed in an enlarged manner by the second mirror 45 and a semi-transmitting mirror 49. As the second mirror 45, for example, a concave mirror may be used. The image displaying unit 40 may be equipped with a transmission optical element such a lens and a prism, etc.

The semi-transmitting mirror 49 is a mirror having a transmissivity of approximately 10% through 70% in the visible range. The semi-transmitting mirror 49 includes a reflective surface, on the side on which the light flux, which is returned from the second mirror 45, is made incident. For example, on the reflective surface, a dielectric multi-layer or a wire grid, etc., is formed. The reflective surface of the semi-transmitting mirror 49 is able to selectively reflect the waveband of the light flux emitted by the laser. That is, the semi-transmitting mirror 49 may be formed to include a reflective peak or a reflective band that encompasses the light emitted from the three lasers corresponding to RGB, or may be formed to intensify the reflectance with respect to a particular deflection direction.

The semi-transmitting mirror 49 may be integrated with, for example, the windshield 125 (see FIG. 1) of the own vehicle 120. By arranging the image displaying unit 40 in front of the driver 130 in the own vehicle 120, the light flux reflected by the reflective surface of the semi-transmitting mirror 49 is made incident on the eyeballs 135 of the driver 130 in the driver seat. Then, a two-dimensional image of the scanned surface 44 is viewed by the driver 130 as the virtual image 110 enlarged at a predetermined position in front of the reflective surface of the semi-transmitting mirror 49.

In the case of the laser scanning type image displaying unit 40 illustrated in FIG. 4, according to an instruction of the image outputting unit 33, the light volume of the laser light sources forming the light source unit 41 is controlled based on the adjustment value of the luminance adjusted by the outside light correcting unit 32. Accordingly, a display image having an appropriate luminance is displayed by being superimposed on the field of vision of the driver 130 as the virtual image 110.

Figure 5:
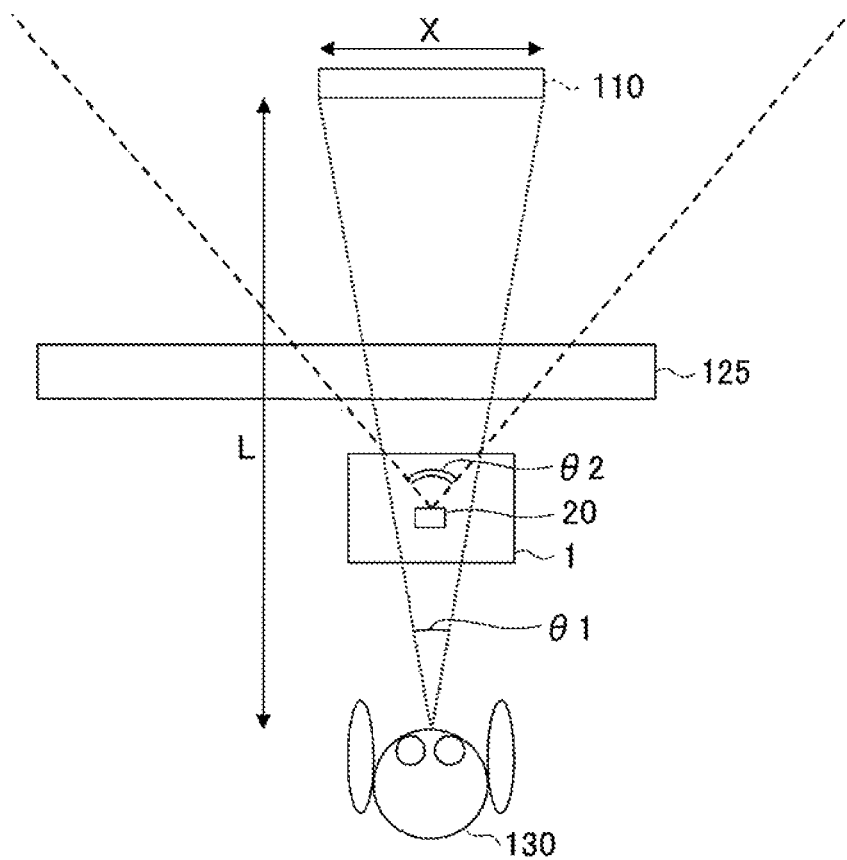
FIG. 5 is a diagram for describing the luminance of an image and the brightness of a background of a virtual image.

Here, a more detailed description is given of the uptake angle restricting unit 10. For example, in FIG. 5, the virtual image 110 is displayed in front of the driver 130, and therefore an angle Si that is formed by the light beams directed from the virtual image 110 toward the eyes of the driver 130 becomes small. Assuming that the distance from the virtual image 110 to the driver 130 is L=2 m and the size of the virtual image 110 is X=50 cm, the angle θ1 becomes θ1=2×arctan (X/2/L) 14.25°.

On the other hand, the outside light uptake angle θ2 of the illuminance detecting unit 20 is generally approximately 60°. Thus, assuming that there is no uptake angle restricting unit 10, the illuminance detecting unit 20 will detect the brightness (illuminance information) of the outside light with respect to a wider range than that of the virtual image 110. In such a case where there is no uptake angle restricting unit 10, when the outside light correcting unit 32 adjusts the luminance of the display image under the circumstances of θ1<<θ2, for example, the adjusted luminance will be deviated with respect to the brightness of the background of the virtual image 110, as described below.

For example, when exiting a tunnel the exit of the tunnel that is the background of the virtual image 110 is wide and bright. However, the outside light taken in by the illuminance detecting unit 20 is weak, because this outside light corresponds to the brightness inside the tunnel, and the luminance of the display image is adjusted to be low. Furthermore, when the sunlight in the daytime enters from the diagonal front side, the background of the angle θ1 is not very bright; however, the outside light taken in by the illuminance detecting unit 20 is intensive because the outside light is sunlight, and the luminance of the display image is adjusted to be high.

However, the display device 1 according to the present embodiment is provided with the uptake angle restricting unit 10, and therefore the illuminance information of the background of the virtual image 110 can be accurately detected, and the outside light correcting unit 33 can be prevented from determining an inappropriate value as the correct ion value of the luminance of the display image. The reason is described as follows.

The following relation is established for the ratio between the luminance of an image and the brightness of the background of the virtual image, with respect to the ratio between the outside light uptake angle θ2 and the angle θ1. That is, when θ2/θ=1, the luminance of the image most closely follows the brightness of the background of the virtual image. However, as θ2 increases with respect to θ1, a deviation will occur between the luminance of the image and the brightness of the background of the virtual image. This deviation is illustrated in FIG. 6.

Figure 6:
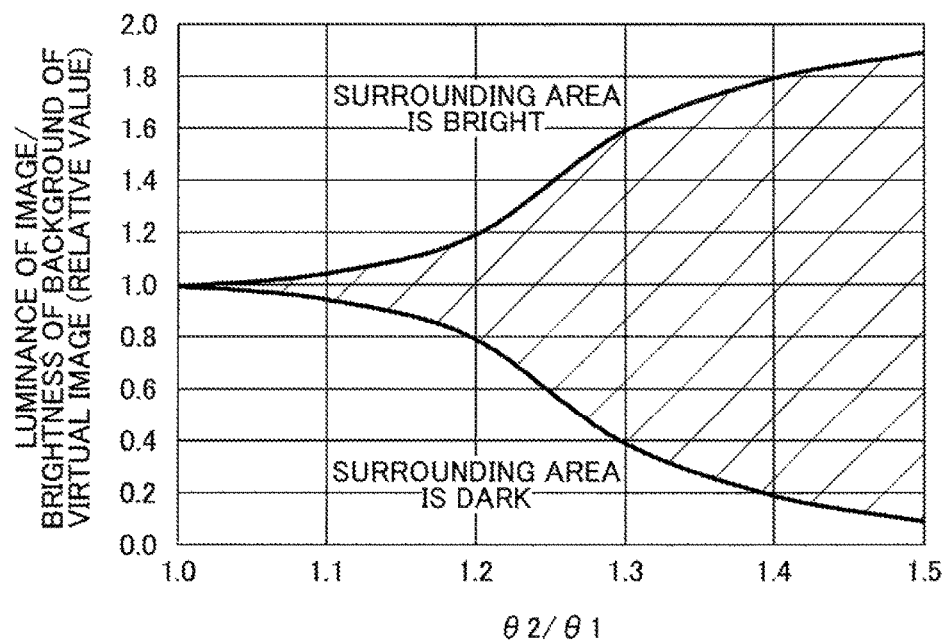
FIG. 6 is a diagram illustrating the relationship between $\theta 2/\theta 1$ and the luminance of an image/the brightness of a background of a virtual image.

As illustrated in FIG. 6, when θ2/θ1 becomes greater than or equal to 1.2, the deviation between the luminance of the image and the brightness of the background of the virtual image will rapidly increase. Thus, in the display device 1 according to the present embodiment, the uptake angle restricting unit 10 is provided on the front side of the illuminance detecting unit 20 (the side on which the outside light is made incident), and the uptake angle restricting unit 10 restricts the outside light uptake angle θ2 according to the angle θ1. For example, the uptake angle restricting unit 10 is able to restrict the outside light uptake angle θ2, such that θ1<θ2<1.2×θ1 (formula 1) is satisfied.

Accordingly, when the surrounding area is bright, or dark, the luminance of the image will follow the brightness of the background of the virtual image. In other words, it is possible to accurately detect the light from the background of the virtual image, and adjust the luminance of the image to closely follow the brightness of the background of the virtual image well, such that the virtual image is easily viewable.

However, formula 1 is one example. A more strict setting may toe made according to the requested performance of the display device 1 (for example, θ1<θ2<1.1×θ1, etc.) or a more lax setting may be made (for example, θ1<θ2<1.3×θ1, etc.). Note that in the following description, as a matter of convenience, a case where θ1<θ2<1.2×θ1 is set is taken as an example.

Figure 7:
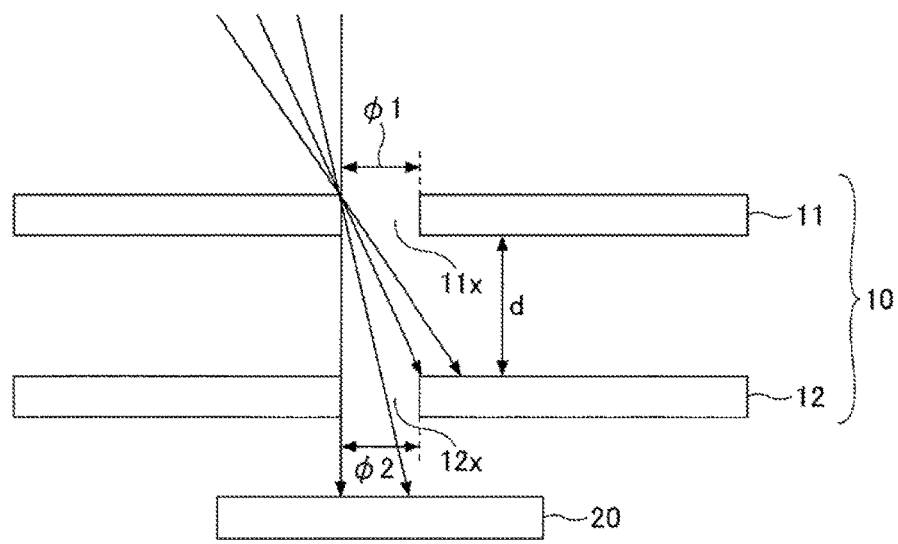
FIG. 7 is a diagram illustrating an example of an uptake angle restricting unit, according to the first embodiment.

FIG. 7 is a diagram illustrating an example of the uptake angle restricting unit according to the first embodiment, and illustrates a specific example for realizing the uptake angle restricting unit 10 satisfying formula 1. In FIG. 7, on the front side of the illuminance detecting unit 20, an opening restricting element 11 (aperture) and an opening restricting element 12 (aperture) are arranged to be substantially parallel to each other and spaced apart by an interval d, to form the uptake angle; restricting unit 10.

The opening restricting element 11 is a plate-shaped member in which an opening part 11x having a substantially circular planar shape is formed. The opening restricting element 12 is a plate-shaped member in which an opening part 12x having a substantially circular planar shape is formed. Only the outside light that has been transmitted through the opening part 11x of the opening restricting element 11 and then through the opening part 12x of the opening restricting element 12, reaches the illuminance detecting unit 20, and other light is blocked. Note that a planar shape is the shape of a target object viewed from the normal line direction of the surface on which the target object is formed.

In the case of FIG. 7, the relationship between the diameter φ1 of the opening part 11x, the diameter φ2 of the opening part 12x, the interval d, and θ2 is θ2=2 arctan {(<φ2+φ1)/(2d)}. Therefore, in order to satisfy formula 1, the diameter 100 1 of the opening part 11x, the diameter φ2 of the opening part 12x, and the interval, d are to be set such that θ1<θ2=2 arctan {(φ2+φ1)/(2d)}<1.2×θ1 is satisfied. By making these settings, it is possible to .block unnecessary stray light from parts other than the background of the virtual image, by a simple configuration.

<Second Embodiment>

A second embodiment indicates an example in which the two opening restricting elements are arranged in a non-parallel manner to form the uptake angle restricting unit. Note that in the second embodiment, descriptions of the same elements as those of the embodiment already described may be omitted.

Figure 8:
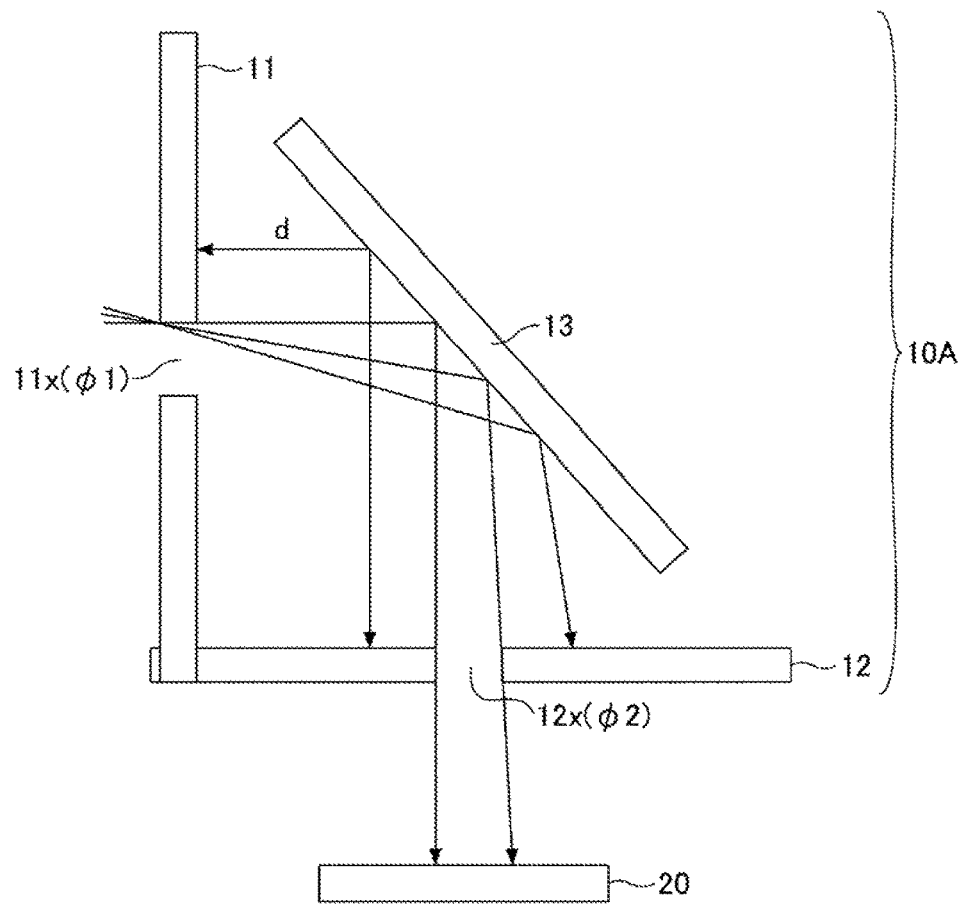
FIG. 8 is a diagram illustrating an example of an uptake angle restricting unit according to a second embodiment.

FIG. 8 is a diagram illustrating an example of an uptake angle restricting unit according to the second embodiment. Referring to FIG. 8, an uptake angle restricting unit 10A includes the plate-shaped opening restricting element 11 in which the opening part 11x having a substantially circular planar shape is formed, the plate-shaped opening restricting element 12 in which the opening part 12x having a substantially circular planar shape is formed, and a deflecting unit 13.

The opening restricting element 11 and the opening restricting element 12 are arranged in a non-parallel manner, and the deflecting unit 13 is arranged between the opening restricting element 11 and the opening restricting element 12. The deflecting unit 13 is a reflection member that deflects the outside light, which has transmitted through the opening part 11x of the opening restricting element 11, in the direction toward the opening part 12x of the opening restricting element 12, For example, a reflective mirror, etc., may be used as the deflecting unit 13. Note that, for example, the opening restricting element 11 and the opening restricting element 12 may be arranged to be orthogonal to each other; however, the arrangement is not so limited.

For example, when the display device 1 is installed in the dashboard of the own vehicle 120, the display device 1 is restricted by the length of the uptake angle restricting unit 10A. For example, when the virtual image 110, which is 2 m ahead and which has a width of 30 cm, is taken in by openings of diameter φ1 of opening part 11x=diameter φ2 of opening part 12x=5 cm, in order to satisfy formula 1, the interval d needs to be greater than or equal to 17 cm.

In this case, by providing the deflecting unit 13 between the opening restricting element 11 and the opening restricting element 12, it is possible to bend the light and shorten the length of the uptake angle restricting unit 10A.

<Third Embodiment>

A third embodiment indicates an example in which the uptake angle restricting unit is formed by a porous body. Note that in the third embodiment, descriptions of the same elements as those of the embodiments already described may be omitted.

Figure 9:
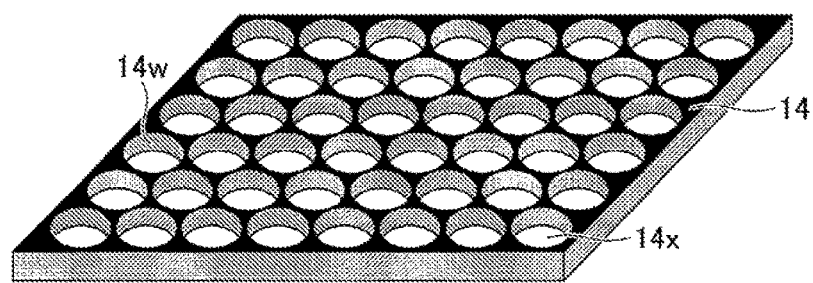
FIG. 9 is a diagram illustrating an example of an uptake angle restricting unit according to a third embodiment.

FIG. 9 is a diagram illustrating an example of an uptake angle restricting unit according to the third embodiment. Referring to FIG. 9, an uptake angle restricting unit 10B is a porous body in which a plurality of opening parts 14x, having a substantially circular planar shape, are formed in a substrate 14 made of metal or plastic, etc. In the uptake angle restricting unit 10B, light shielding walls 14w, which are the inner wall parts of the opening parts 14x, are preferably colored by a black color, etc., such that the light to be shielded is not reflected or scattered. Accordingly, it is possible to shield the light that is incident on the inner wail parts of the opening parts 14x.

Figure 10A:
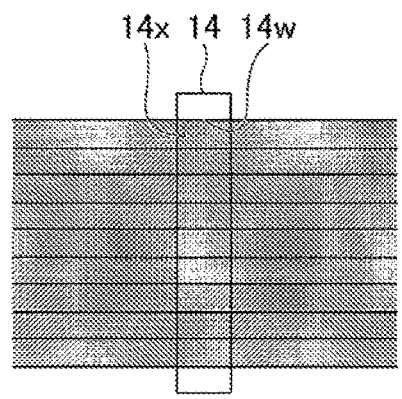
FIG. 10A is a diagram for describing the operations of light shielding walls.
Figure 10B:
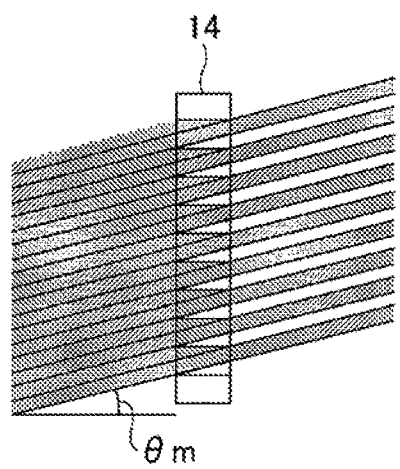
FIG. 10B is a diagram for describing the operations of light shielding wails.
Figure 10C:
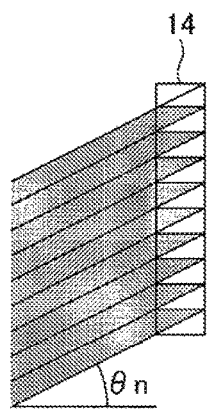
FIG. 10C is a diagram for describing the operations of light shielding walls.

FIGS. 10A, 10B, and 10C are diagrams for describing the operations of the light shielding walls. As illustrated in FIG. 10A, the outside light incident on the substrate 14 at an incident angle θ=0° (background of virtual image) passes through the opening parts 14x without being shielded. On the other hand, as illustrated in FIG. 10B, in the case of outside light deviated from the background of the virtual image (for example, incident angle θ=θm), it is difficult for the outside light to pass through the opening parts 14x, and part of the outside light is shielded. As illustrated in FIG. 10C, when the incident angle θ becomes even larger than θm (for example, incident angle θ=θn), there is no outside light that passes through the opening parts 14x (completely shielded).

Figure 11:
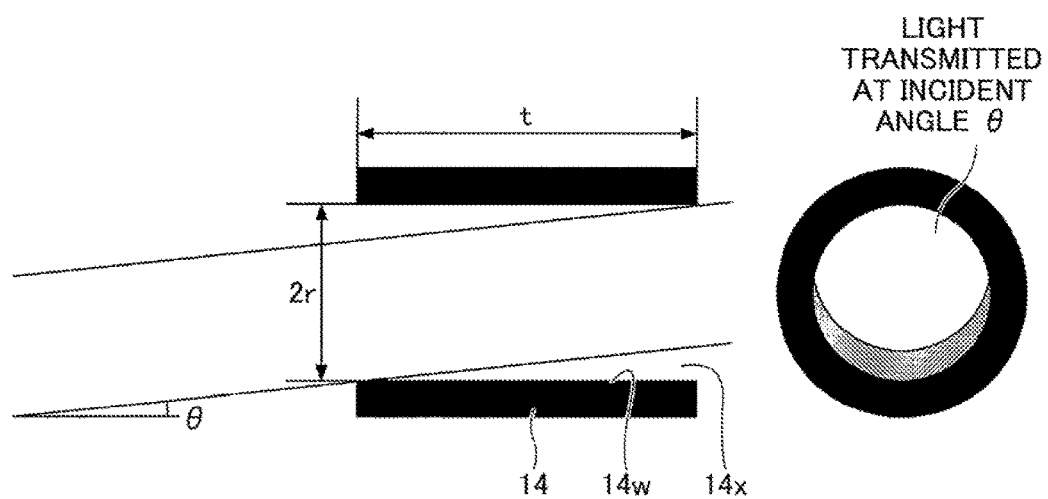
FIG. 11 is a diagram illustrating an example of the cross-sectional shape of the uptake angle restricting unit according to the third embodiment.

FIG. 11 is a diagram illustrating an example of the cross-sectional, shape of the uptake angle restricting unit according to the third embodiment. As illustrated in FIG. 11, assuming that the thickness of the substrate 14 is t, the diameter of the opening part 14x is 2r, and the incident angle (uptake angle) is θ, and in the case where the intensity of the incident light has a uniform intensity distribution, the transmitted light intensity I (the intensity of light passing through the opening parts 14x) is expressed by the following formula 2, assuming that the time of θ=0° is 1.

$$I = \frac{2\arccos\left(\frac{t\tan\theta}{2r}\right) - \sin\left\{2\arccos\left(\frac{t\tan\theta}{2r}\right)\right\}}{\pi} \quad \text{(Formula 2)}$$

Figure 12:
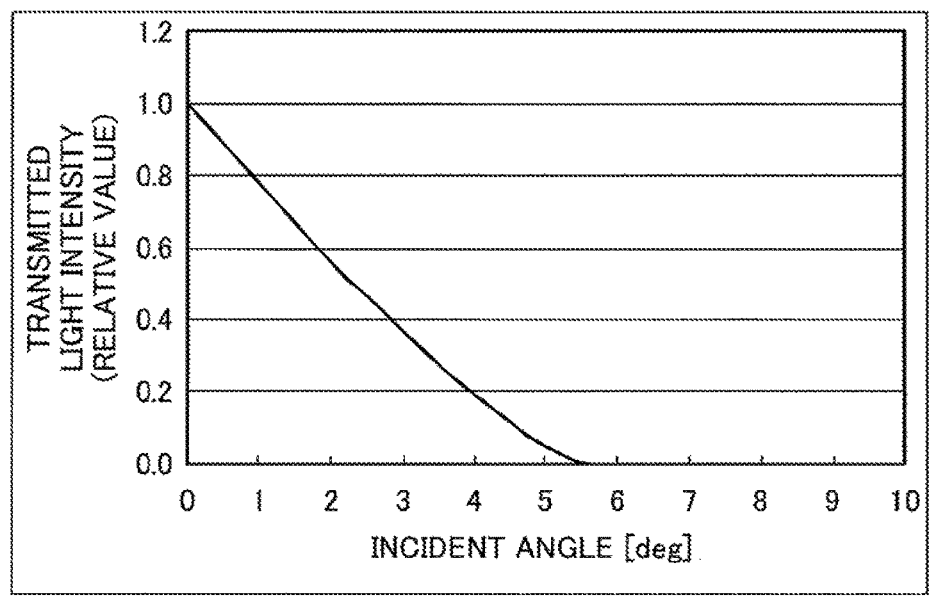
FIG. 12 is a diagram illustrating an example of the relationship between an incident angle and the transmitted light intensity.

For example, assuming that t=2 mm, 2r=0.2 mm, the transmitted light intensity I decreases with respect to the incident angle θ, as illustrated in FIG. 12,. As described above, by the uptake, angle restricting unit 10B that is a porous body, the transmitted light intensity can be decreased as the incident angle of the incident light increases, and therefore the stray light entering from parts other than the background of the virtual image can be shielded. Furthermore, by using a porous body, the diameters of the opening parts 14x can be reduced, and therefore the uptake angle restricting unit 10 can be made compact.

Figure 13A:
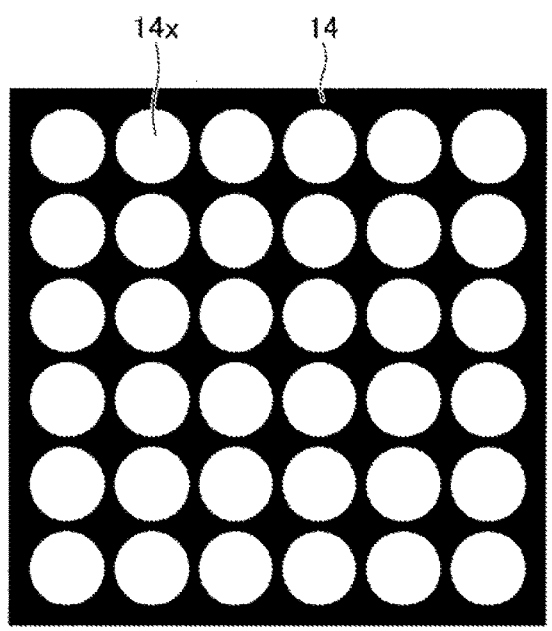
FIG. 13A is a diagram illustrating an example of an arrangement of opening parts of the uptake angle restricting unit according to the third embodiment.
Figure 13B:
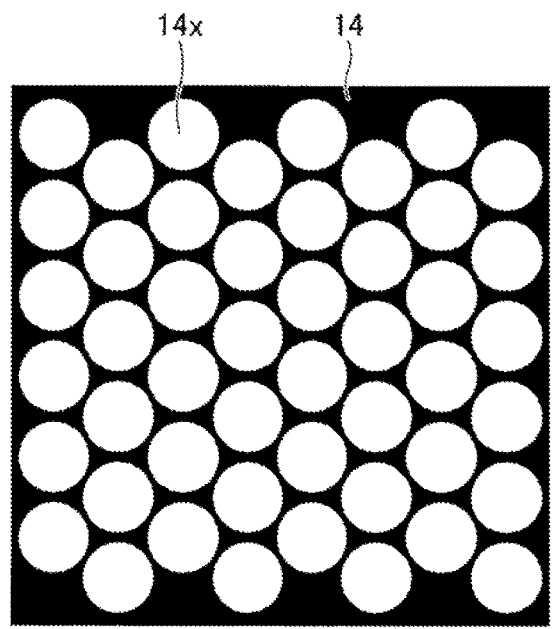
FIG. 13B is a diagram illustrating an example of an arrangement of opening parts of the uptake angle restricting unit according to the third embodiment.

FIGS. 13A and 13B are diagrams illustrating examples of arrangements of the opening parts of the uptake angle restricting unit according to the third embodiment. As illustrated in FIG. 13A, when the opening parts 14x are arranged in a grid, even when the light enters at an incident angle of 0°, the light is shielded at the parts corresponding to the spaces between the opening parts 14x, and the transmission efficiency decreases. When the transmission efficiency decreases it is necessary to set a high gain for the A/D conversion in the A/D input unit 31 of the image processing unit 30, and therefore noise increases.

Thus, as illustrated in FIG. 13B, the opening parts 14x are preferably arranged in a hound's tooth manner. When the opening parts 14x are arranged in a hound/s tooth manner, the spaces between the opening parts 14x can be reduced, and therefore if is possible to reduce the ratio of the light entering at an incident angle of 0° being shielded by the spaces between the opening parts 14x, and the decrease in the transmission efficiency can be suppressed. As a result, there will be no need to set a high gain for A/D conversion in the A/D input unit 31 of the image processing unit 30, and the increase in noise can be suppressed.

Figure 14A:
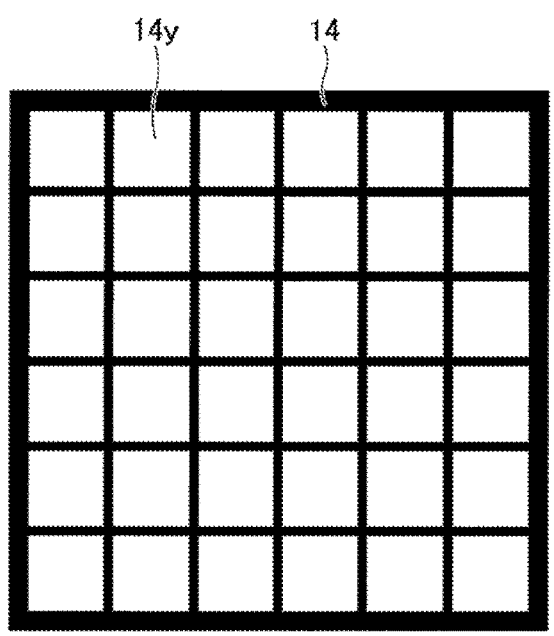
FIG. 14A is a diagram illustrating another example of an arrangement of opening parts of the uptake angle restricting unit according to the third embodiment (part 1)
Figure 14B:
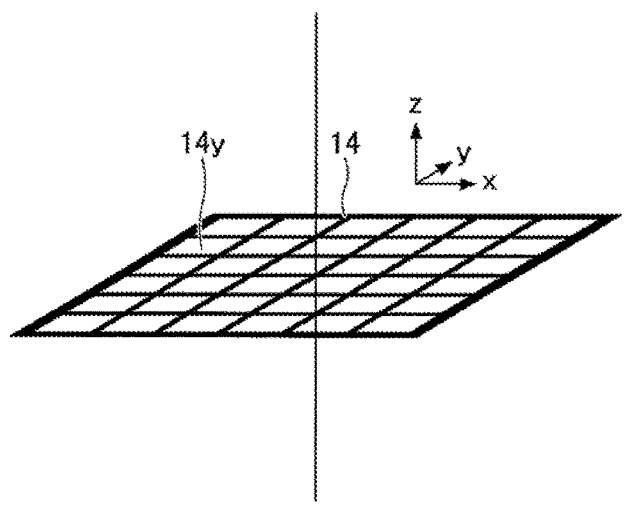
FIG. 14B is a diagram, illustrating another example of an arrangement of opening parts of the uptake angle restricting unit according to the third embodiment (part 1)

FIGS. 14A and 14B are diagrams illustrating another example of arrangements of the opening parts of the uptake angle restricting unit according to the third embodiment. As illustrated in FIGS. 14A and 14B, the uptake angle restricting unit 10B that is a porous body is not limited to the opening parts 14x having a substantially circular planar shape; the uptake angle restricting unit 10B may include opening parts 14y having rectangular planar shapes.

By forming the uptake angle restricting unit 10B to have the opening parts 14y having rectangular planar shapes, the spaces between the opening parts 14y can be made narrower compared to the case of the opening parts 14x having substantially circular planar shapes. Therefore, the transmission efficiency of the porous body can be further increased, and the noise at the time of A/D conversion can be further reduced.

Figure 15:
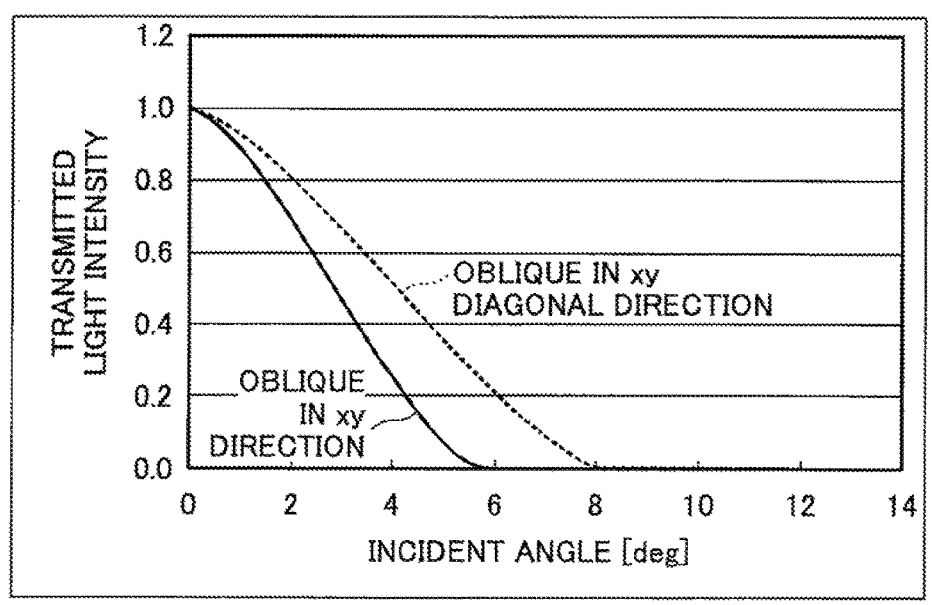
FIG. 15 is a diagram illustrating an example of the impact of the diagonal angle.

However, when the uptake angle restricting unit 10B is formed to have the opening parts 14y having rectangular planar shapes, the size of the opening parts 14y is different, in a case of incident light that is oblique in a direction parallel to the gridlines (x, y), and in a case of light entering from a diagonal direction with respect to the gridlines. Therefore, as illustrated in FIG. 15, comparing the transmitted light intensity of the porous body in the case of the incident light that is oblique in the x direction and the y direction, with the case of the incident light that is oblique in the xy diagonal direction, a problem arises in that the decrease in the transmitted light intensity is mitigated in the case of the incident light that is oblique in the xy diagonal direction.

Figure 16:
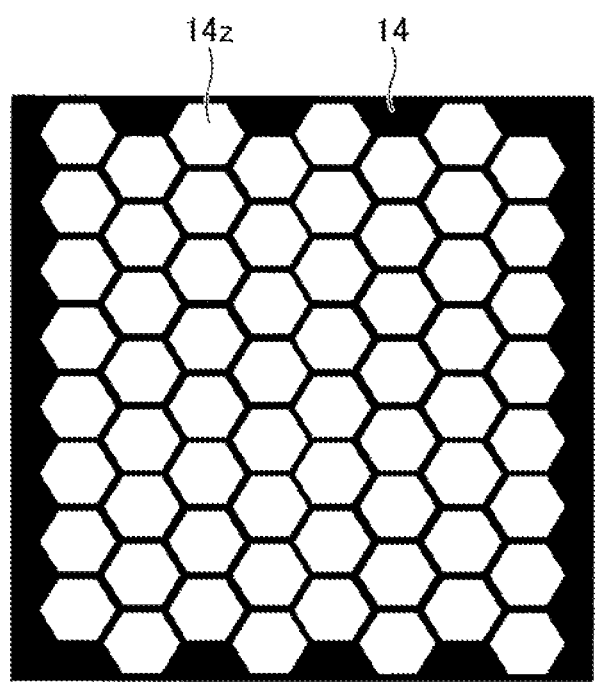
FIG. 16 is a diagram illustrating another example of an arrangement of opening parts of the uptake angle restricting unit according to the third embodiment (part 2).

Thus, as illustrated in FIG. 16, the opening parts are formed to have a honeycomb structure, in which a plurality of opening parts 14z having hexagonal planar shapes are arranged on the substrate 14 in a hound's tooth manner without spaces. Accordingly, it is possible to reduce the ratio of the light being shielded by the spaces between the opening parts 14z, and therefore the decrease in the transmission efficiency can be suppressed. As a result, there will be no need to set a high gain for A/D conversion in the A/D input unit 31 of the image; processing unit 30, and therefore the increase in noise can be suppressed. In addition, the variation in the size of the opening parts 14z, which is caused by the oblique direction of the incident light, can be reduced, and deviations in the transmitted light intensity depending on the incident angle can be decreased.

Preferred embodiments are described above in detail; however, the present invention is not limited to the above embodiments, and variations and replacements may be made to the above embodiments without departing from the scope of the present invention.

For example, the above embodiments indicate an example in which three lasers are used in the image displaying unit 40; however, a single laser may be used to form a monochrome image. In this case, there is: no need for the composite element.

According to one embodiment of the present invention, a display device, etc., capable of accurately detecting illuminance information of a background of a virtual image, can be provided.

The a display device and the vehicle are not limited to the specific embodiments described in the detailed description, and variations and modifications may be made without departing from the spirit and scope of the present invention.

What is claimed is:

1. A display device for displaying a virtual image in front of a driver of a vehicle, the display device comprising:
   an illuminance detector configured to receive light surrounding the vehicle, and detect a brightness of the received light;
   an uptake angle restricting device configured to restrict an angle of the light received by the illuminance detector;
   circuitry configured to adjust a luminance of a display image, according to the brightness of the light detected by the illuminance detector; and
   a display configured to display the display image by superimposing the display image on a field of vision of the driver as the virtual image, based on a result of adjusting the luminance, wherein
   the uptake angle restricting device includes a first opening restricting element and a second opening restricting element arranged in parallel on a front side of the illuminance detector, the first opening restricting element being a plate-shaped member having a substantially circular first opening part with a first diameter $\varphi 1$, the second opening restricting element being a plate-shaped member having a substantially circular second opening part with a second diameter $\varphi 2$, the first opening restricting element and the second opening restricting element being spaced apart by a predetermined interval d such that an angle $\theta 2$ at which the illuminance detector receives the light is restricted according to an angle $\theta 1$ formed by light beams directed from the display image toward eyes of the driver, and
   a relationship between the first diameter ($\varphi 1$, the second diameter $\varphi 2$, the predetermined interval d, the angle $\theta 2$, and the angle $\theta 1$ is set such that $\theta 1 < \theta 2 = 2\arctan\{(\varphi 2 + \varphi 1)/(2d)\} < C \times \theta 1$, where C is a predetermined constant determined based on a value of $\theta 2/\theta 1$ at which a deviation between the luminance of the display image and a brightness of a background of the display image becomes greater than a prescribed value.

2. The display device according to claim 1, wherein
   the display includes a laser light source and an optical deflector configured to deflect a laser beam emitted from the laser light source, and
   a light volume of the laser light source is controlled based on the luminance adjusted by the circuitry.

3. A vehicle comprising:
   the display device according to claim 1 installed therein.

4. The display device according to claim 1, wherein only light that is transmitted through the first opening part and the second opening part is detected by the illuminance detector.

5. The display device according to claim 1, wherein the two opening parts are arranged in parallel to each other.

6. The display device according to claim 1, wherein the each of the two opening parts has a circular planar shape.

7. A display device for displaying a virtual image in front of a driver of a vehicle, the display device comprising:
- an illuminance detecting unit configured to receive light surrounding the vehicle, and detect a brightness of the received light;
- an uptake angle restricting unit configured to restrict an angle of the light received by the illuminance detecting unit;
- an outside light correcting unit configured to adjust a luminance of a display image, according to the brightness of the light detected by the illuminance detector detecting unit; and
- an image displaying unit configured to display the display image by superimposing the display image on a field of vision of the driver as the virtual image, based on a result of adjusting the luminance, wherein
- the uptake angle restricting unit includes a first opening restricting element and a second opening restricting element arranged in parallel on a front side of the illuminance detecting unit, the first opening restricting element being a plate-shaped member having a substantially circular first opening part with a first diameter $\varphi 1$, the second opening restricting element being a plate-shaped member having a substantially circular second opening part with a second diameter $\varphi 2$, the first opening restricting element and the second opening restricting element being spaced apart by a predetermined interval d such that an angle $\theta 2$ at which the illuminance detecting unit receives the light is restricted according to an angle $\theta 1$ formed by light beams directed from the display image toward eyes of the driver, and
- a relationship between the first diameter $\varphi 1$, the second diameter $\varphi 2$, the predetermined interval d, the angle $\theta 2$, and the angle $\theta 1$ is set such that $\theta 1 < \theta 2 = 2 \arctan\{(\varphi 2 + \varphi 1)/(2d)\} < C \times \theta 1$, where C is a predetermined constant determined based on a value of $\theta 2/\theta 1$ at which a deviation between the luminance of the display image and a brightness of a background of the display image becomes greater than a prescribed value.

8. The display device according to claim 7, wherein
- the image displaying unit includes a laser light source and an optical deflector configured to deflect a laser beam emitted from the laser light source, and
- a light volume of the laser light source is controlled based on the luminance adjusted by the outside light correcting unit.

* * * * *